(12) United States Patent
Penfold (10) Patent No.: US 9,248,948 B2
(45) Date of Patent: Feb. 2, 2016

(54) DISPENSING DEVICE

(71) Applicant: Brightwell Dispensers Limited, Newhaven (GB)

(72) Inventor: Timothy David Penfold, Newhaven (GB)

(73) Assignee: Brightwell Dispensers Limited, Newhaven (GB)

( * ) Notice: Subject to any disclaimer, the term of this patent is extended or adjusted under 35 U.S.C. 154(b) by 78 days.

(21) Appl. No.: 14/042,082

(22) Filed: Sep. 30, 2013

(65) Prior Publication Data

US 2014/0091110 A1  Apr. 3, 2014

(30) Foreign Application Priority Data

Oct. 2, 2012 (GB) .................................. 1217626.9

(51) Int. Cl.
  *B65D 83/00* (2006.01)
  *G01F 11/02* (2006.01)

(52) U.S. Cl.
  CPC .......... *B65D 83/0038* (2013.01); *G01F 11/025* (2013.01)

(58) Field of Classification Search
  CPC ........................... B65D 83/0038; G01F 11/025
  USPC ............... 222/282, 340, 434, 379, 386, 386.5
  See application file for complete search history.

(56) References Cited

U.S. PATENT DOCUMENTS

| 3,302,462 | A | * | 2/1967 | Pursell ........................ 73/864.15 |
| 4,016,765 | A | * | 4/1977 | Lee ............................ 73/864.15 |
| RE30,483 | E | * | 1/1981 | Seitz et al. .................. 73/864.18 |
| 4,294,125 | A | | 10/1981 | Lee |
| 4,650,099 | A | * | 3/1987 | Paulsen et al. ................. 222/263 |
| 5,615,806 | A | | 4/1997 | Grothoff |
| 5,908,143 | A | | 6/1999 | Crossdale et al. |
| 2003/0168477 | A1 | | 9/2003 | Heukamp |

FOREIGN PATENT DOCUMENTS

| GB | 1 466 760 | 3/1977 |
| WO | WO 97/23156 | 7/1977 |

* cited by examiner

*Primary Examiner* — Kevin P Shaver
*Assistant Examiner* — Robert Nichols, II
(74) *Attorney, Agent, or Firm* — Levy & Grandinetti (57) ABSTRACT

A dispensing device is disclosed having a cylinder, a piston disposed in the cylinder and moveable in priming and dispensing directions, including a spring device biasing the piston to move in the priming direction at a predetermined rate, and an operating plunger connectable to the piston and moveable along a path to move the piston in the dispensing direction. The operating plunger has an engagement device and is moveable between an engaged position in which the engagement device is connected to the piston and movement of the plunger along the path is transmitted to the piston, and a disengaged position in which the engagement device is disconnected from the piston and movement of the plunger along the path is independent of the piston. The engagement device is arranged such that movement of the plunger between the engaged and disengaged positions is of a different kind to movement along the path.

31 Claims, 6 Drawing Sheets

DISPENSING DEVICE

The present invention relates to a dispensing device for use particularly, but not exclusively, to dispense metered doses of a chemical cleaning liquid.

When chemical cleaning products are provided for use on an industrial scale, for example for cleaning hospitals or hotels, they are generally packaged in concentrated form. It is therefore necessary to mix the concentrated product with water to achieve a desired dilution vatic for use. It is known to provide manual dispensing devices which dispense a metered dose of concentrated product for mixing with a particular quantity of water. These generally comprise a piston and cylinder arrangement which draws a particular quantity of the concentrated product from a reservoir in a priming stroke, and then dispenses that product in a dispensing stroke. The metered dose dispensed is the capacity of the cylinder.

A problem with this arrangement is that the dispensing device can be manually operated before the piston has returned to the top of the cylinder, which results in less than the intended dose of concentrated product being dispensed. If this occurs the resulting mixture has the incorrect dilution ratio. A further problem is that there is nothing to prevent users from repeatedly operating the dispensing device to dispense an excessive amount of the concentrated product. This is a particular problem if the concentrated product is corrosive or otherwise hazardous in its concentrated and less diluted forms.

In order to overcome these problems more advanced dispensing devices comprise an operating plunger which is automatically disengaged from the piston after a dispensing stroke thereof, and prevented from being reengaged until the piston has performed its priming stroke and the cylinder is fully primed. As such, the dispensing device cannot be operated to dispense anything other than the intended dose. In addition, it is also known to impede the performance of the priming stroke in order to introduce a delay time before the device can be operated once again. This serves to deter the repeated operation of the dispensing device to dispense an excessive amount.

An example of such a dispensing device is shown in WO 97/23156 to Unilever. Here the operating plunger can be manually depressed to move the piston up the cylinder and dispense a single shot of liquid therefrom, but the plunger is then moved by a spring back to a stand by position independently of the piston. It is then locked in that position so it cannot be depressed, and is automatically unlocked by the arrival of the piston back to its primed position. Detents lock the plunger in its stand by position, which are released by the piston when it achieves its primed position.

There are a number of drawbacks with the design shown in WO 97/23156 to Unilever. The first is that it is overly complex, and requires space to accommodate the movement of the resilient detents. These detents are also problematic because they can suffer from fatigue over time and lose their effectiveness. Secondly, there is the functional drawback that the operating plunger is locked in its stand-by position during the priming stroke of the piston, and a user unfamiliar with this locking functioning may attempt to force it in the belief that it is stuck. This can lead to damage. Finally, once the device is primed and the operating plunger unlocked, it can be manually operated merely by depression thereof. Therefore any inadvertent contact with the operating plunger can activate the dosing device.

The present invention is intended to overcome some of the above problems.

Therefore, according to the present invention a dispensing device comprises a cylinder, a piston disposed in said cylinder and moveable therein in a priming direction and in a dispensing direction, a first spring means biasing said piston to move in said priming direction at a predetermined rate, and an operating plunger operatively connectable to said piston and moveable along a path to move said piston in said dispensing direction, in which said operating plunger comprises engagement means and is moveable between an engaged position in which said engagement means are operatively connected to said piston and movement of said operating plunger along said path is transmitted to said piston, and a disengaged position in which said engagement means are operatively disconnected from said piston and movement of said operating plunger along said path is independent of said piston, and in which said engagement means are arranged such that movement of said operating plunger between said engaged and disengaged positions is of a different kind to movement along said path.

Thus, in the dispensing device of the present invention it is necessary to first move the operating plunger into the engaged position before it can be moved along its path to drive the piston. As this movement is of a different kind to movement along the path, inadvertent activation of the device can be avoided. In addition, in the present invention the operating plunger can be moved harmlessly along its path when it is not connected to the piston, which avoids the problems associated with locking the operating plunger in a stand by position. A dispenser can also be realised which achieves the various above described advantages of delayed single shot dispensers like that shown in WO 97/23156 to Unilever, without complex additional operating plunger locking features. In particular, as with such designs the piston is moved in the priming direction at a predetermined rate, which can be relatively slow in order to introduce a delay time before the device can be operated again, which deters repeated operation to dispense an excessive amount.

It will be appreciated that the engagement means can be arranged such that any movement of the operating plunger which is different to movement along its path could be provided. For example, in one version of the invention the engagement means can operatively connect with the piston through a lateral movement of the operating plunger which is substantially normal to movement along its path. If movement along the path comprises a depression of the operating plunger into a body of the dispenser, then this lateral movement could be from either side, or from above or below the depression position. The engagement means could be a tab which interacts laterally with a slot provided on the piston.

However, in a preferred construction the operating plunger can comprise a rotation axis, and it can be rotated on this axis to move it between the engaged and disengaged positions. This arrangement is advantageous because it is not necessary to provide for any lateral movement of the operating plunger, which would increase the size of the dispenser, and because there is less likelihood of inadvertent rotation of the operating plunger than of any inadvertent movement in a lateral direction. Furthermore, rotation requires a conscious manual effort of the user, which increases their interaction with the device and decreases the likelihood of accidental over dosing.

The operating plunger can be offset from the piston, and its path can be oblique to a stroke axis of the piston. For example, in one arrangement the operating plunger can be mounted to a hinge on the dispenser about which the part of the operating plunger which is connected to the piston rotates in a planetary fashion. As such, the path of the operating plunger can be actuate, and a joint between the operating plunger and the piston can transmit this motion into a linear motion of the piston along its stroke axis. This kind of arrangement is provided if the operating plunger is activated by, or is integrated with, an outer cover of the dispenser.

However, in a preferred construction the piston and the operating plunger can be arranged co-axially on a stroke axis, and the path of the operating plunger can comprise said stroke axis. As such, to drive the piston the operating plunger is simply depressed in a linear fashion by the user.

The dispenser can comprise a second spring means biasing the operating plunger to move from its engaged position to its disengaged position. As such, when the operating plunger is released by the user after a dispensing stroke, it rotates automatically back to the disengaged position.

The operating plunger can be movable axially on the stroke axis between an outer point and an inner point, and the second spring means can also bias the operating plunger to move from said inner point to said outer point. Therefore, not only does the operating plunger move automatically to the disengaged position when it is released, but it also moves back out to its original position.

The engagement means can be any known mechanism which allows for two parts to be operatively connected for axial movement via a relative rotational movement. In one version of the invention the piston can comprise a radially outwardly extending slot, and the operating plunger can comprise a radially inwardly extending tab which moves into said slot when the operating plunger is rotated. However, in a preferred construction the piston can comprise a radially outwardly extending tab, the operating plunger can comprise a radially inwardly extending slot, and in the engaged position said tab can be disposed in said slot.

The tab and slot can be axially co-incident when the piston is at a top of the cylinder after a priming stroke thereof and the operating plunger is at its outer point. This is important because it means that rotation of the operating plunger to operatively connect it to the piston is only possible once the piston has completed its priming stroke, and not before. This prevents the dispensing of half doses of product by driving the piston before it has completed its priming stroke.

Following on from this, the operating plunger can comprise an axially extending wall, and when the operating plunger is at its outer point and in its disengaged position, and the piston is displaced from the top of said cylinder, said wall can engage the tab and prevent movement of the operating plunger from its disengaged position to its engaged position. This feature prevents the operating plunger from being rotated on its axis at all until the tab and the slot are axially co-incident.

The first spring means can bias the piston to move in its priming direction at a predetermined rate in any known way. For example, it can simply comprise a relatively weak strength. However, in a preferred construction the first spring means can comprise a first coil spring biasing the piston to move in its priming direction, and an impedance mechanism adapted to impede movement of the piston in its priming direction to at or below the predetermined rate. The impedance mechanism can be any fluid flow restriction into the cylinder, which can be provided at an inlet thereof, or downstream in a supply hose. With this construction the first coil spring can be relatively strong, and it can drive the piston in the priming direction at the maximum rate permitted by the impedance mechanism.

In a preferred embodiment the piston can comprises a face, an annular side wall extending therefrom and comprising an outer end, a flange extending radially from said outer end and comprising an outer edge, and a collar extending substantially normally from said outer edge. When the piston is at a bottom of the cylinder after a dispensing stroke thereof the flange can overlie the top of the cylinder and the collar can be disposed radially outwardly of the cylinder. Further, the operating plunger can comprise a substantially tubular body disposed radially outwardly of the collar, the tab can be provided on an outer surface of the collar and the slot and wall can be provided on an inner surface of said tubular body.

The first coil spring can be mounted inside the cylinder, or in a spring chamber co-axial therewith. However, in a preferred embodiment it can be mounted around the cylinder between a first static surface of the dispensing device and an underside of the flange. This first static surface can be an area of the interior framework of the dispenser surrounding the bottom of the cylinder. A first end stop surface can be provided which prevents the movement of the piston in the cylinder beyond the primed position. With this arrangement the first coil spring can be mounted under compression between the first static surface and the underside of the flange in all positions of the piston in the cylinder. Mounting the first coil spring in this position, and in this state is an expedient and compact arrangement.

The dispensing device can also comprise a second static surface disposed axially between the operating plunger and the piston. The second spring means can then comprise a second coil spring mounted inside the operating plunger between the second static surface and an underside of an end wall of the operating plunger. The second spring means can be rotationally fixed at both ends to the second static surface and the end wall, such that rotation of the operating plunger into the engaged position places the second coil spring under torsional compression, such that is biases the operating plunger back into the disengaged position. A second end stop surface can be provided which prevents the movement of the operating plunger beyond its outer point. With this arrangement the second coil spring can be mounted under axial compression between the second static surface and the underside of the end wall. Again, this arrangement is expedient and compact.

In one version of the invention the piston can comprise an indicator member extending outwardly from an underside of the face thereof, and the end wall of the operating plunger can comprise an aperture. The indicator member can be so sized that when the tab and slot are axially co-incident and/or the operating plunger is in the engaged position, the indicator member is disposed in the aperture.

This feature provides a visual indication to the user that the piston has returned independently of the operating plunger to its primed position, and the dispensing device can be operated once again. Preferably the indicator member comprise a coil spring carrying an indicator body at an outer end thereof.

The invention can be performed in various ways, but one embodiment will now be described by way of example, and with reference to the accompanying drawings, in which.

Figure 1:
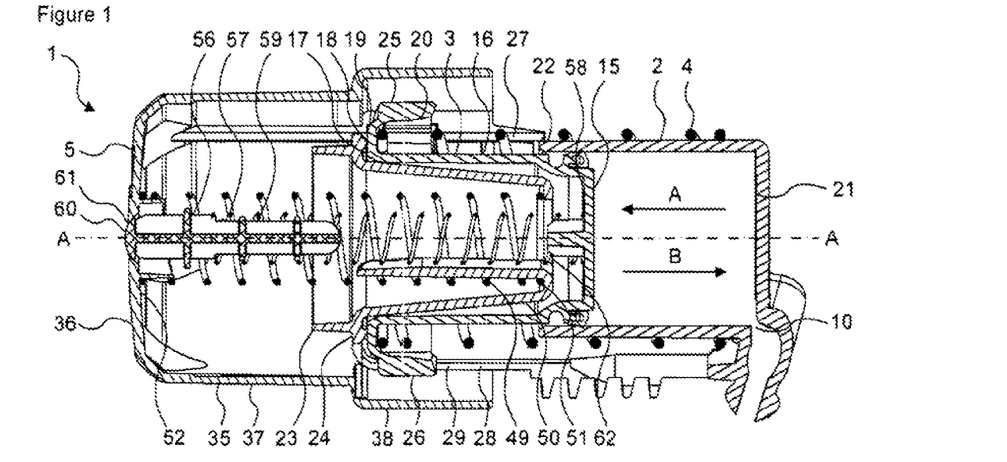
FIG. 1 is an oblique cross-sectional side view of the relevant parts of a dispensing device according to the present invention in a first position.
Figure 2:
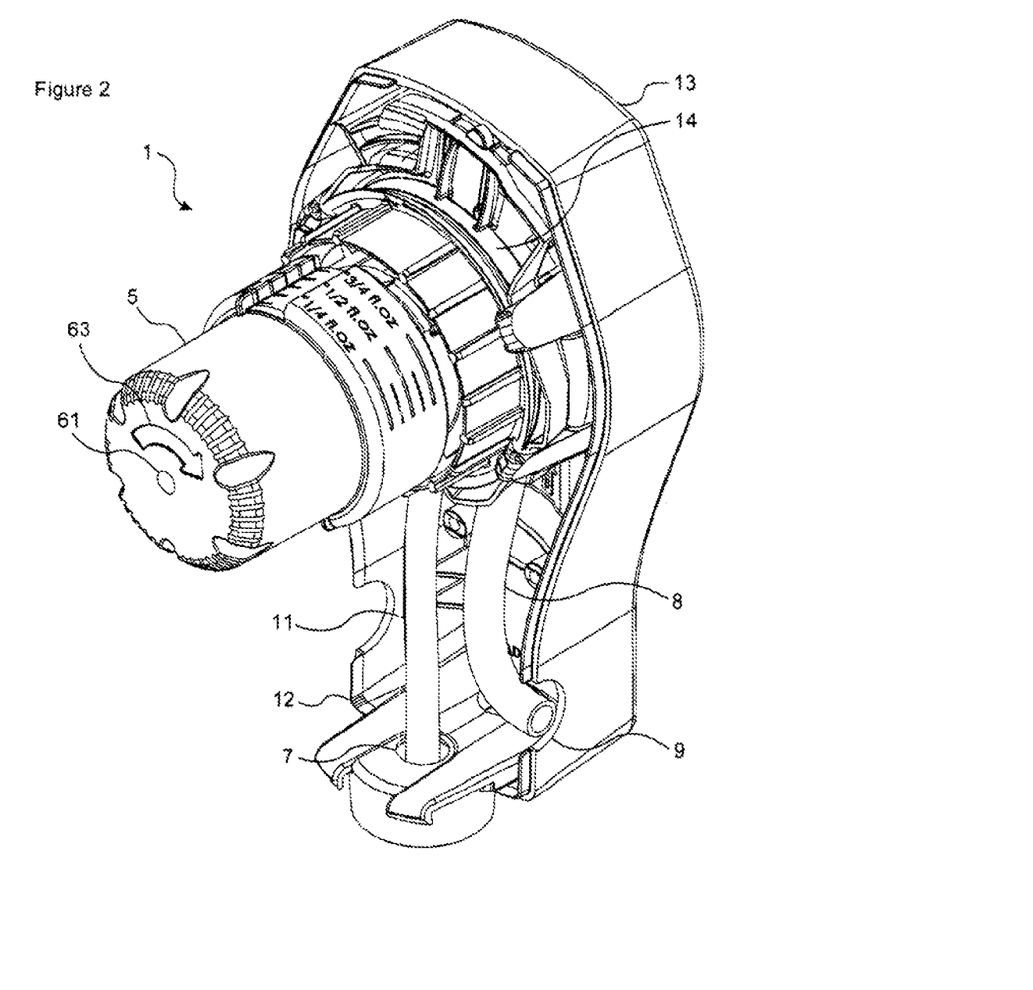
FIG. 2 is a perspective view of the dispensing device as shown in FIG. 1 in the first position.
Figure 3:
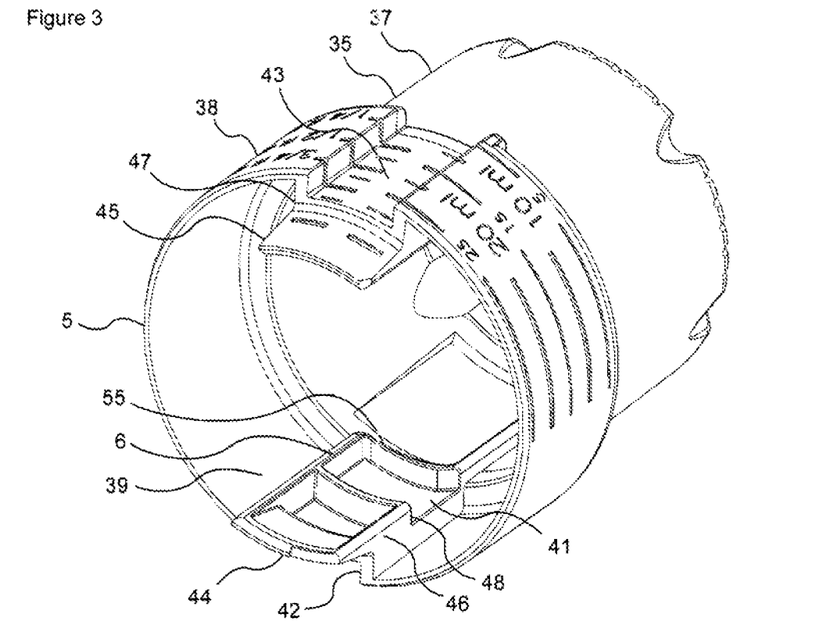
FIG. 3 is a rear perspective view of an operating plunger part of the dispensing device as shown in FIG. 1.

Therefore, as shown in FIG. 1, a dispensing device 1 comprises a cylinder 2, and a piston 3 disposed in said cylinder 2, and moveable therein in a priming direction, indicated by arrow A, and in a dispensing direction, indicated by arrow B. There is also a first spring means biasing said piston to move in said priming direction at a predetermined rate, in the form of first coil spring 4 and a fluid flow restrictor (not shown), and an operating plunger 5, which as described further below is operatively connectable to said piston 3 and moveable along a path A-A to move said piston 3 in said dispensing direction, indicated by arrow B. The operating plunger 5 comprises engagement means, in the form of radially inwardly extending slot 6, which is best seen in FIG. 3, and is moveable between an engaged position, as shown in FIGS. 5-8, in which said engagement means (6) are operatively connected to said piston 3 and movement of said operating plunger 5 along said path A-A is transmitted to said piston 3, and a disengaged position, as shown in FIGS. 1, 2, 9 and 10, in which said engagement means (6) are operatively disconnected from said piston 3 and movement of said operating plunger 5 along said path A-A is independent of said piston 3. As explained further below, the engagement means (6) are arranged such that movement of said operating plunger 5 between said engaged and disengaged positions is of a different kind to movement along said path A-A.

(For the sake of clarity FIGS. 1, 5, 7, 9 and 10 show oblique cross-sectional side views which are at approximately 40 degrees to vertical. This angle has been chosen because it passes through the tabs 25 and 26 of the piston 3, and therefore shows the operative connection between the tabs 25 and 26 and the slots 6 and 40 in the engaged position of the operating plunger 5. This would not be visible in a standard cross-sectional side view because the tabs 25 and 26 do not extend through the vertical plane. The other parts of the dispensing device 1 shown in these Figures are annular, so appear much as they would in a standard cross-sectional side view.)

The dispensing device 1 is configured like known devices, in that it comprises a cylinder 2 and piston 3 pump arrangement which draws fluid to be dispensed from a reservoir (not shown), and then dispenses a metered dose through an outlet 7. Referring to FIG. 2, a reservoir is attached to the cylinder 2 by a fluid line 8, which passes through an inlet 9, and travels up to the cylinder 2 above. The fluid product is drawn into the cylinder 2 automatically in use through an inlet (not visible) by negative pressure generated by movement of the piston 3 in the priming direction A, under pressure from the first coil spring 4. A fluid flow restrictor (not shown) of a known kind is provided in the fluid line 8 (or adjacent the inlet), which restricts the rate at which the fluid product can pass through the fluid line 8, and therefore the rate at which the piston 3 can move in the priming direction A, under pressure from the first coil spring 4. As such, an in-built delay is incorporated into the automatic priming action of the piston 3. The first coil spring 4 is of such a strength that it can drive the piston 3 in the priming direction A at the maximum rate permitted by the fluid flow restrictor.

A one-way valve (not shown) is provided at the fluid inlet which allows the fluid product to enter the cylinder 2. Movement of the piston 3 in the dispensing direction B under pressure from the user acting on the operating plunger 5, forces fluid product inside the cylinder 2 out of a fluid outlet 10 thereof. A one-way valve (not shown) is provided at the fluid outlet 10 which allows the fluid product to exit the cylinder 2. It is then sent down a second fluid line 11 to the outlet 7 at the bottom 12 of the device 1. A spout fixture or other fluid connection means can be provided at the outlet 7 to conveniently direct the fluid product for the user.

As shown in FIG. 2, the dispensing device comprises a back plate 13, on which is provided a framework 14 which supports the cylinder 2 and piston 3 pump arrangement. The framework 14 also supports a number of other components which relate to adjusting the capacity of the cylinder 2 and piston 3 pump arrangement. These components are not relevant to the present invention so are not further described here.

Referring back to FIG. 1, the cylinder 2, piston 3 and operating plunger 5 are all arranged co-axially on a stroke axis A-A. As such, the device 1 has a linear configuration in which the path of the operating plunger 5 comprises this stroke axis A-A, and to drive the piston 3 the operating plunger 5 is simply depressed by the user.

The piston 2 comprises a face 15, an annular side wall 16 extending therefrom and comprising an outer end 17, a flange 18 extending radially from said outer end 17 and comprising an outer edge 19, and a collar 20 extending substantially normally from said outer edge 19. As is clear from FIG. 1 the annular side wall 16 fits snugly inside the cylinder 2, and as is clear from FIG. 7, when the piston 3 is at a bottom 21 of the cylinder 2 after a dispensing stroke thereof the flange 18 overlies a top 22 of the cylinder 2, and the collar 20 is disposed radially outwardly of the cylinder 2. The first coil spring 4 is mounted around the cylinder 2, between a first static surface (not shown) being an area of the framework 14 surrounding the bottom 21 of the cylinder 2, and the flange 18.

Figure 11:
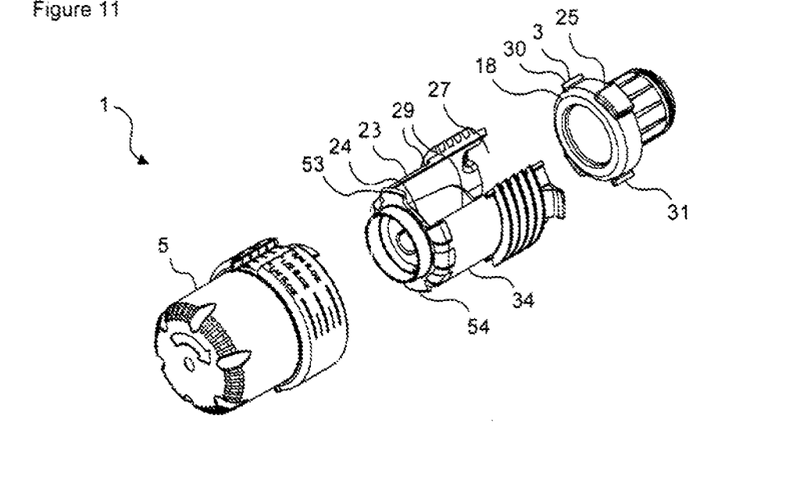
FIG. 11 is an exploded perspective view of the piston part, a retention member part and the operating plunger part of the dispensing device as shown in FIG. 1; and, FIG. 12 is a cross-sectional top view of the relevant parts of the dispensing device as shown in FIG. 1 in the first position.

Mounted over the piston 2 is a retention member 23, which can be seen in a perspective view in FIG. 11. It is a tubular part 34 which extends from the framework 14 and encloses the cylinder 2 and piston 3. It also comprises an end stop ring 24 which prevents the movement of the piston 3 in the cylinder 1 beyond the primed position, as shown in FIG. 1. The flange 18 abuts against the end stop ring 24 in this position. In addition, the first coil spring 4 is held in compression in this position, so it is constantly held in some state of compression.

Figure 4:
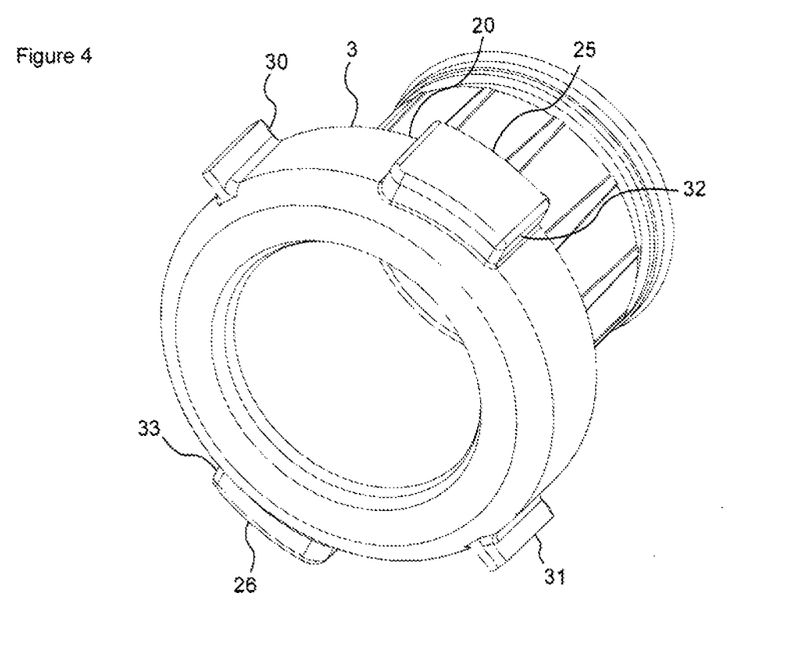
FIG. 4 is a front perspective view of a piston part of the dispensing device as shown in FIG. 1.

As is shown in FIG. 4, the collar 20 comprises a pair of opposite tabs 25 and 26 which extend radially outwardly therefrom. These tabs 25 and 26 are visible in FIG. 1 because of the oblique cross-sectional view shown. The tubular part of the retention member 23 is slightly radially larger than the flange 18, but it is radially smaller than the tabs 25 and 26. It therefore comprises a pair of openings 27 and 28 on opposite sides thereof, through which the tabs 25 and 26 radially protrude. The collar 20, and therefore the piston 3, is held in its rotational position through interaction with the sides 29 of the openings 27 and 28, only one of which is visible in FIG. 1 because of the oblique cross-sectional view shown, but which can be seen clearly in FIG. 11. The collar 20 comprises a pair of opposite positioning fins 30 and 31, and each of these abut against one side 29 of a corresponding opening 27 or 28, and the far sides 32 and 33 of the tabs 25 and 26 respectively abut against the other side 29 of the corresponding opening 27 or 28. The fins 30 and 31, and the sides 32 and 33 ride against the sides 29 of the openings 27 and 28 when the piston 3 moves in the priming direction A or the dispensing direction B.

Figure 12:
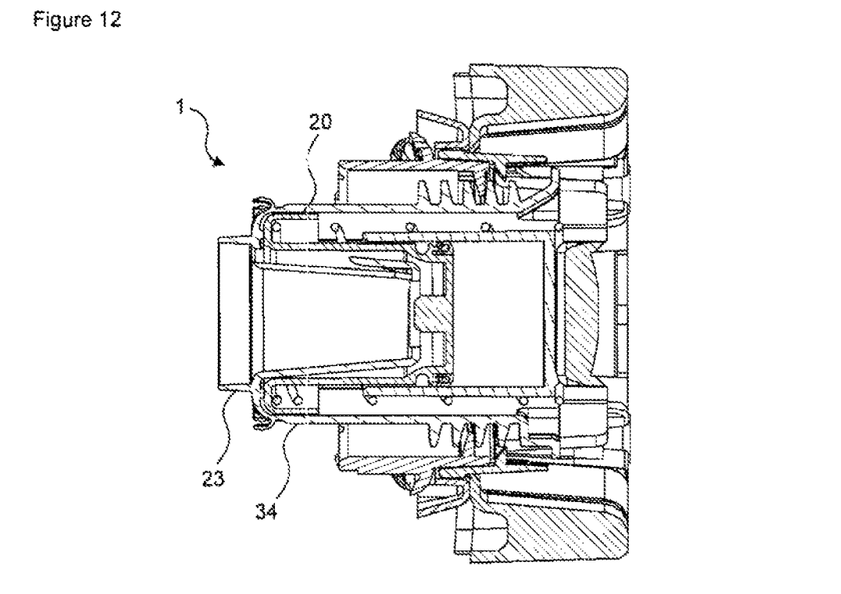

FIG. 12 shows a cross-sectional top view of the relevant parts of the dispenser 1. In this view the shape and position of the retention member 23 can be better seen, because the cross-section passes through the tubular part 34 of the retention member 23, as opposed to through the openings 27 and 28 as in the other Figures. It can also be seen from FIG. 12 how the collar 20 fits inside the tubular part 34 of the retention member 23.

The operating plunger 5 comprises a substantially tubular body 35 comprising an end wall 36, an outer tubular portion 37 and an inner tubular portion 38 which comprises a greater radius from the stroke axis A-A than the outer tubular portion 37. As is clear from the Figures the outer tubular portion 37 is slightly radially larger than the radial extent of the tabs 25 and 26. Referring to FIG. 3, an interior surface 39 of the inner tubular portion 38 comprises a pair of radially inwardly extending slots 6 and 40, only one of which 6 is visible in FIG. 3. Each slot 6, 40 comprises a circumferentially facing opening, only one of which 41 is visible.

The operating plunger 5 is rotatable on stroke axis A-A between a disengaged position, as shown in FIGS. 1, 2, 9 and 10, in which the slots 6 and 40 are displaced from the corresponding tabs 26 and 25 respectively, and an engaged position as shown in FIGS. 5-8, in which the tabs 26 and 25 are located in the slots 6 and 40 respectively. The extent of the possible rotation is defined by the interaction between the operating plunger 5, the tabs 25 and 26, and the retention member 23. In particular, as is clear from FIG. 3, the slots 6 and 40 are formed in each case on a radially inwardly protruding section 42 and 43 respectively formed in the inner tubular portion 38. The sections 42 and 43 are also provided in each case with an axially extending location tab 44 and 45 respectively. The sections 42 and 43 comprise a radius from the stroke axis A-A which is less than that of the tubular part 34 of the retention member 23, and as such they protrude radially inwardly into the corresponding openings 28 and 27 respectively. This serves to define the limits of rotational movement of the operating plunger 5, as the sections 42 and 43 cannot rotate in either direction beyond the sides 29 of the openings 28 and 27 respectively. (In the disengaged position of the operating plunger 5 the sections 42 and 43 actually come into contact with the positioning fins 31 and 30 respectively and not the sides 29, because the positioning fins 31 and 30 are disposed against the sides 29 in a position which is axially co-incident with the sections 42 and 43.) In addition, in the engaged position of the operating plunger 5 the tabs 26 and 25 are fully located in the slots 6 and 40 respectively, so further rotation of the operating plunger 5 is prevented.

Figure 9:
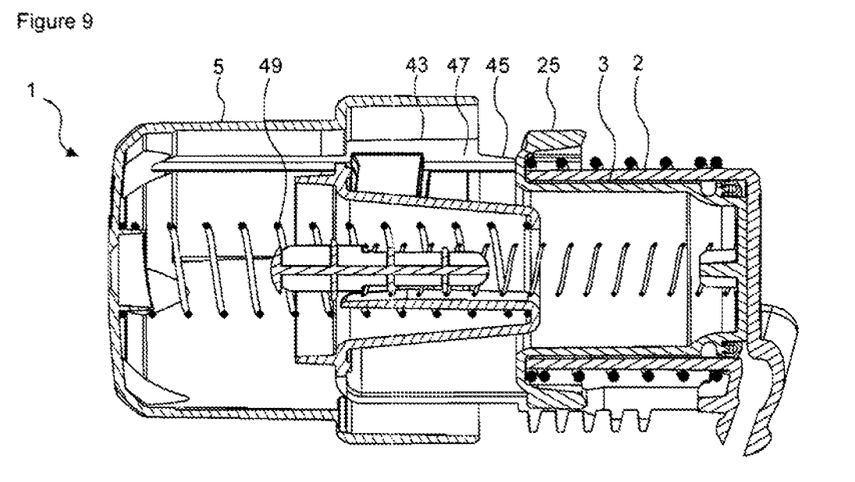
FIG. 9 is an oblique cross-sectional side view of the relevant parts of the dispensing device as shown in FIG. 1 in a fourth position.
Figure 10:
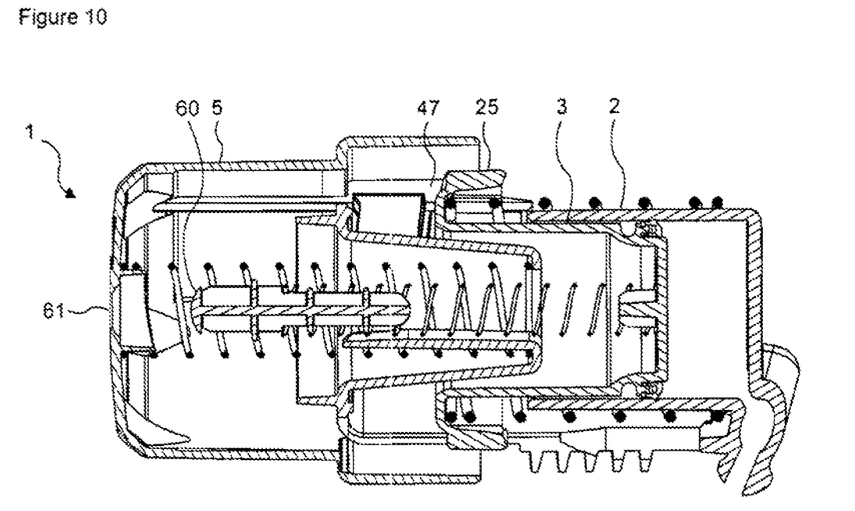
FIG. 10 is an oblique cross-sectional side view of the relevant parts of the dispensing device as shown in FIG. 1 in a fifth position.

Following on from this, the operating plunger 5 also comprises a pair of axially extending walls 46 and 47, which extend from the inner ends, only one of which 48 is visible, of the slots 6 and 40, to the ends of the location tabs 44 and 45. When the operating plunger 5 is at an outer point thereof, and in the disengaged position, and the piston 3 is displaced from the top 22 of said cylinder 2, as shown in FIGS. 9 and 10, any attempt to rotate the operating plunger 5 from the disengaged position to the engaged position results in the walls 46 and 47 rotationally engaging the tabs 26 and 25 respectively, which prevents the operating plunger 5 from moving into the engaged position. Therefore, in this particular in-use configuration rotational movement of the operating plunger 5 is restricted. The situation changes when the tabs 26 and 25 are once again axially co-incident with the slots 6 and 40 respectively, and therefore no longer axially co-incident with the walls 47 and 46 respectively.

The operating plunger 5 is connected to the retention member 23 by a second coil spring 49. The retention member 23 comprises an inwardly depending portion 50, which extends inwardly from the end stop ring 34. At the bottom of the inwardly depending portion 50 is a base surface 51, which defines the second static surface referred to above. It will be appreciated that this base surface 51 is disposed axially between the operating plunger 5 and the piston 3. The second coil spring 49 is mounted inside the operating plunger 5 between the base surface 51 and an underside 52 of the end wall 36. The second coil spring 49 is rotationally fixed in position at both ends. It is disposed such that movement of the operating plunger 5 from the disengaged position into the engaged position places it under torsional compression. Therefore, a first function of the second coil spring 49 is that it biases the operating plunger 5 to move from said engaged position to said disengaged position, by virtue of the way it is torsionally statically mounted at both ends.

Referring to FIG. 11, the retention member 23 comprises a pair of radially extending retention tabs 53 and 54, which are disposed in the path of outer walls, only one of which 55 is visible in FIG. 3, of the slots 6 and 40 when the operating plunger 5 is disposed in its disengaged position, as shown in FIGS. 1, 2, 9 and 10, which prevents the operating plunger 5 from moving any further out from the position shown. Therefore, these retention tabs 53 and 54 define an outer point in the axial movement range of the operating plunger 5 in the disengaged position. The operating plunger 5 cannot be rotated to displace the walls 55 from the retention tabs 53 and 54 while the tabs 25 and 26 of the piston 3 are not axially co-incident with the slots 40 and 6 respectively, which would release the operating plunger 5, because the axially extending walls 46 and 47 described above prevent any such rotation. The second coil spring 49 is held in axial compression in this position, so it is constantly held in some state of compression. Therefore, a second function of the second coil spring 49 is that it biases the operating plunger 5 to move to its outer position from any depressed position. As such, if the operating plunger 5 is released by the user after a dispensing stroke, as explained further below, the second coil spring 49 acts to return the operating plunger 5 to its disengaged position and to its outer point simultaneously, and independently of the piston 3.

Figure 5:
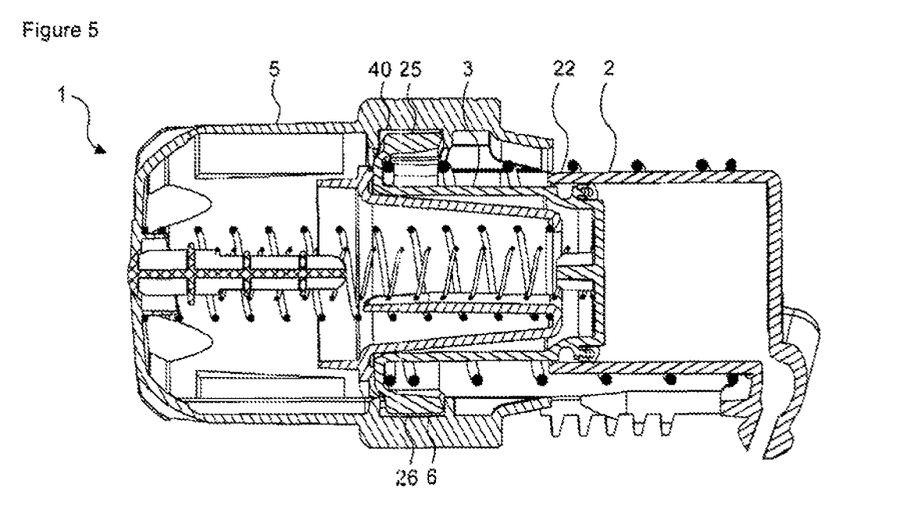
FIG. 5 is an oblique cross-sectional side view of the relevant parts of the dispensing device as shown in FIG. 1 in a second position.

Referring to FIGS. 1 and 5, it will be appreciated that the tabs 25 and 26 and the slots 6 and 40 are axially co-incident when the piston 3 is at the top 22 of the cylinder 2 after a priming stroke thereof, and the operating plunger 5 is at its outer point. As such, rotation of the operating plunger 5 to operatively connect it to said piston 3 is only possible once the piston 3 has completed its priming stroke, and not before.

The piston 3 also comprises an indicator member 56, which is mounted on a third coil spring 57, which is itself mounted to an underside 58 of the face 15 of the piston 3. The indicator member 56 comprises a body 59 and a face 60. The end wall 36 of the operating plunger 5 also comprises an aperture 61. An aperture 62 is also provided in the retention member 23 through which the third coil spring 57 passes. As is clear from FIG. 1, the indicator member 56 is so arranged that when the tabs 25 and 26 of the piston 3 and the slots 6 and 40 of the operating plunger 5 are axially co-incident and/or the operating plunger 5 is in the engaged position, as shown in FIGS. 1, 2 and 5-8, the face 60 is disposed in the aperture 61.

The operating plunger 5 also comprises an indicator arrow 63, which illustrates the manner of rotation required to move the operating plunger 5 into the engaged position.

The dispensing device 1 operates as follows. Firstly, an outer end of the fluid line 8 is placed into a reservoir of fluid to be dispensed (not shown). To prepare the dispensing device 1 for use the piston 3 must be driven back and forth in the cylinder 2 a few times to draw the fluid up the fluid line 8 to the inlet of the cylinder 2, into the cylinder 2 itself and then down the second fluid line 11. Once some fluid emerges from the end of the second fluid line 11, or any spout fixture attached thereto (not shown), then the dispensing device 1 is ready to operate. (The manner in which the piston 3 is driven in this way is the same as the manner in which it is moved to dispense fluid in use, which is described below.)

A user places their receptacle at the outlet 7, or any spout fixture attached thereto, to capture the dispensed dose of fluid. They then rotate the operating plunger 5 clockwise, as indicated by the arrow 63, to move it from the disengaged position shown in FIGS. 1 and 2 to the engaged position shown in FIGS. 5 and 6. As explained above, this movement places the second coil spring 49 under torsional compression, and as such the user will feel a degree of spring resistance. This rotational movement sees the slots 6 and 40 rotate into position over the tabs 26 and 25 respectively. The rotational movement ends when the sections 42 and 43 of the operating plunger 5 engaged the sides 29 of the openings 28 and 27 respectively of the retention member 23, and the tabs 26 and 25 are fully located in the slots 6 and 40 respectively. The piston 3 is held axially in place during this action because the sides 32 and 33 of the tabs 25 and 26 respectively abut against the sides 29 of the openings 27 and 28 respectively, in the engaged position the operating plunger 5 and the piston 3 are operatively connected.

Figure 7:
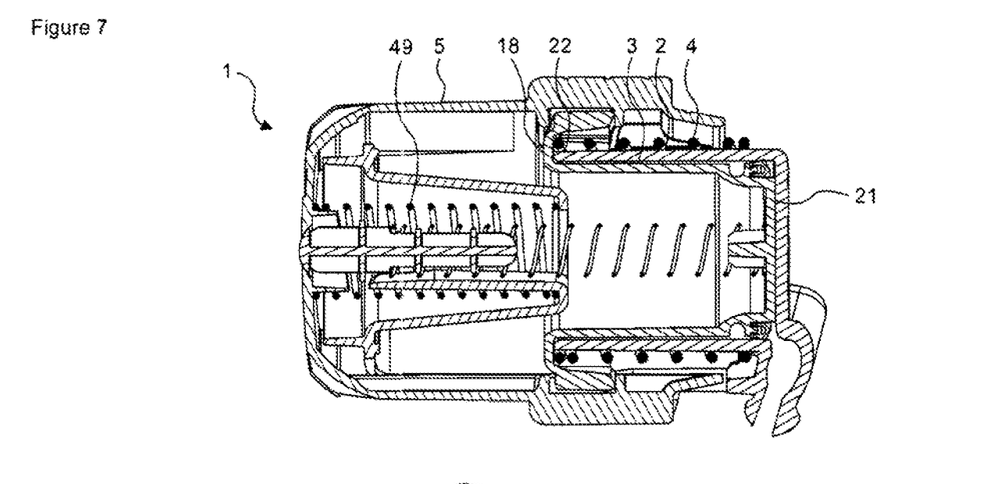
FIG. 7 is an oblique cross-sectional side view of the relevant parts of the dispensing device as shown in FIG. 1 in a third position.

If a user does not rotate the operating plunger 5 in this way, and instead simply depresses it, then it will move from its outer point as shown in FIG. 1, to its inner point, as shown in FIG. 7, without engaging the piston 3. As such, the dispensing device 1 will not be operated to dispense a dose of fluid. This will be immediately apparent to the user, who can then try again by first rotating the operating plunger 5 so it engages the piston 3. In addition, it will be appreciated that if the operating plunger 5 is inadvertently depressed, this will not lead to any fluid being dispensed.

Before the user attempts to rotate the operating plunger 5 they can check the aperture 61 for the presence of the face 60 of the indicator member 56. If the face 60 is present in the aperture 56, then the piston 3 is located at the top 22 of the cylinder 2 in its primed position, and the dispensing device 1 is ready to operate. If the piston 3 is not located in its primed position, because it is still moving in the priming direction A after a dispensing stroke has been performed, as shown in FIG. 10, then the face 60 will not be located in the aperture 61, and the user can know that they must wait a moment before attempting to rotate the operating plunger 5. If the user attempts to rotate the operating plunger 5 before the piston 3 is located at the top 22 of the cylinder 2, this will be prevented because the walls 46 and 47 of the operating plunger 5 will rotationally engaging the tabs 26 and 25 respectively, preventing the operating plunger 5 from moving into the engaged position. It will then be apparent to the user that the dispensing device 1 is not ready to be used. They can then wait until the face 60 appears in the aperture 61, and the tabs 26 and 25 are once again axially co-incident with the slots 6 and 40 respectively.

Figure 6:
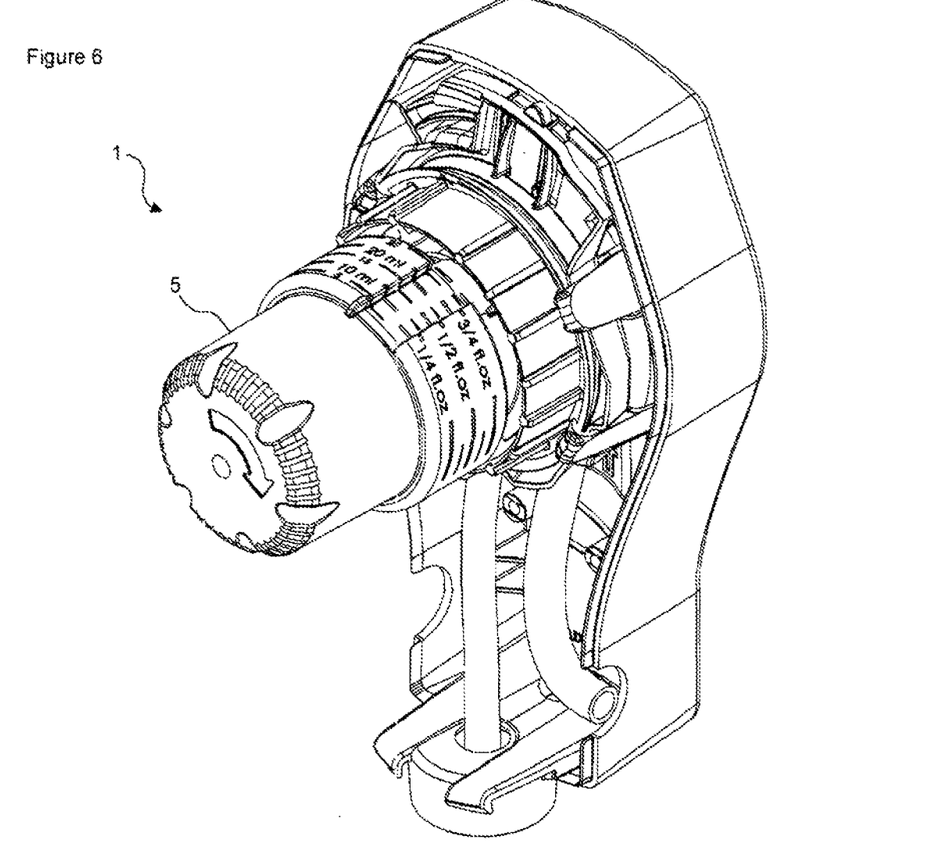
FIG. 6 is a perspective view of the dispensing device as shown in FIG. 1 in the second position.
Figure 8:
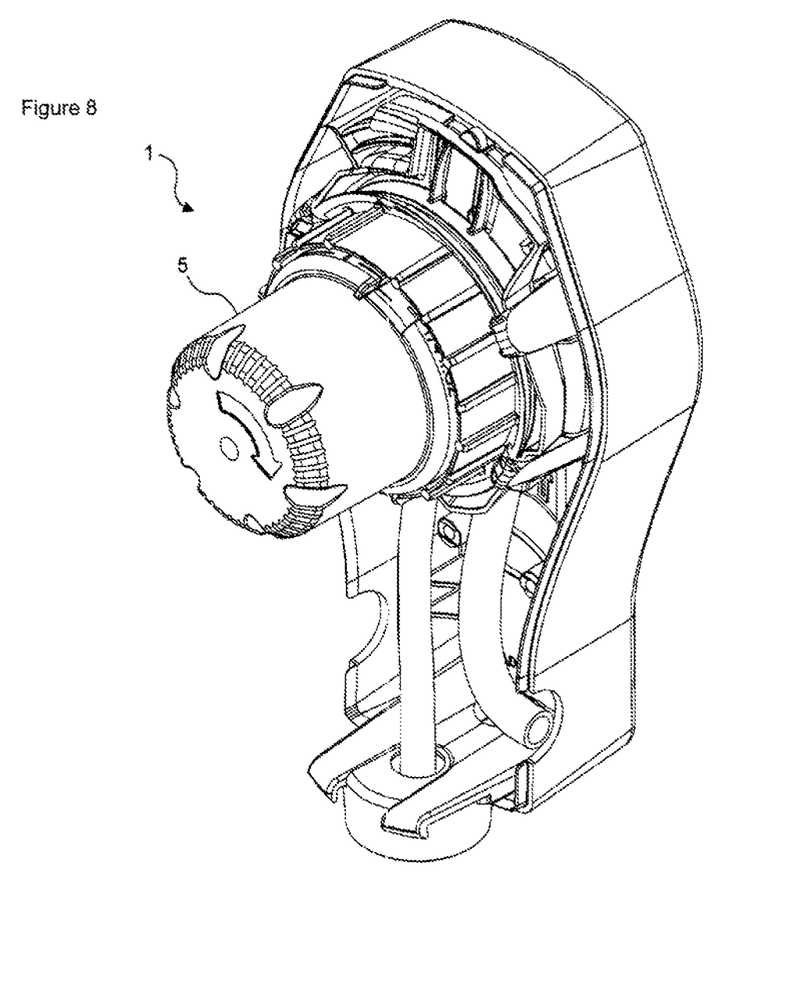
FIG. 8 is a perspective view of the dispensing device as shown in FIG. 1 in the third position.

Once the operating plunger 5 has been operatively connected to the piston 3 as shown in FIGS. 5 and 6, the user depresses the operating plunger 5 to drive the piston 3 in the dispensing direction B until it reaches the bottom 21 of the cylinder 2, as shown in FIGS. 7 and 8. The slots 6 and 40 moveably engage the tabs 26 and 25 respectively, which moves the face 15 of the piston 3 down the cylinder 2. This action is performed against the strength of the first coil spring 4 and the second coil spring 49, as well as against the frictional resistance of the fluid exiting the cylinder 2 and travelling down the second fluid line 11, and as such the user will feel a degree of spring resistance. It will be appreciated that the performance of a dispensing stroke will pump an amount of fluid from the second fluid line 11 equal to the capacity of the cylinder 2. Therefore, the dose dispensed is precisely controlled.

The user then releases the operating plunger 5, and it immediately rotates back into the disengaged position, under the torsional force of the second coil spring 49. This rotates the slots 6 and 40 away from the tabs 26 and 25 respectively, and moves the operating plunger 5 until the sections 42 and 43 of thereof engage the positioning fins 31 and 30 respectively, which are disposed against the corresponding sides 29 of the openings 28 and 27 respectively of the retention member 23. However, as soon as the tabs 26 and 25 are free of the slots 6 and 40 respectively the operating plunger 5 immediately moves axially along the stroke axis A-A back to its outer point, as shown in FIG. 9, under the axial force of the second coil spring 49. It will be appreciated from FIG. 9 that the sections 42 and 43 are of such a length thanks to the presence of the location tabs 44 and 45, that even with the operating plunger 5 at its outer point, and the piston 3 in the fully dispensed position, the sections 42 and 43 are still axially co-incident with the positioning fins 31 and 32. As such, the operating plunger 5 stays in the same rotational position in the disengaged position thereof, regardless of the axial position of the piston 3. This axial movement of the operating plunger 5 is arrested when the outer walls 55 of the slots 6 and 40 come into contact with the retention tabs 53 and 54 of the retention member 23. It will be appreciated that the return of the operating plunger 5 to its starting position is independent of the piston 3.

At the same time that the user releases the operating plunger 5 the piston 3 begins its priming stroke, by moving in the priming direction B under the force of the first coil spring 4. However, it takes longer for the piston 3 to complete its priming stroke than the operating plunger 5 takes to return to its outer point, because the fluid flow restrictor (not shown) provided in the fluid line 8 restricts the rate at which the fluid can pass therethrough, and therefore the rate at which the piston 3 can draw it into the cylinder 2. FIG. 10 illustrates a mid-point at which the piston 3 has travelled approximately half way back up the cylinder 2. Therefore, an in-built delay is incorporated into the automatic priming action of the piston 3.

If the user attempts to rotate the operating plunger 5 in order to engage the piston 3 for another stroke before it is once again located at the top 22 of the cylinder 2, this is prevented because the walls 46 and 47 of the operating plunger 5 rotationally engaging the tabs 26 and 25 respectively. This serves to prevent the user from operating the dispensing device 1 while the cylinder 2 is only partially replenished with fluid, and less than a full dose would be dispensed. Only once the piston 3 has returned to the top of the cylinder 2 and the cylinder 2 is once again fully primed with a full dosage, can the user rotate the operating plunger 5 into the engaged position. It will be appreciated from FIG. 9 that the walls 46 and

47 are of such a length thanks to the presence of the location tabs 44 and 45, that even with the operating plunger 5 at its outer point, and the piston 3 in the fully dispensed position, the walls 46 and 47 are still axially co-incident with the tabs 26 and 25 respectively. Therefore, not only is there an in-built delay in the performance of the priming stroke of the piston 3, but the user is prevented from operating the device 1 for the duration of the delay, and until a full dose can be dispensed again. This prevents repeated operations of the device 1 to dispense an excessive amount, and it also prevents the operating of the device 1 to dispense less than a full dose, which can lead to an incorrect dilution ratio in a mixed product to be used.

Before the user attempts to rotate the operating plunger 5 they can check the aperture 61 for the presence of the face 60 of the indicator member 56. If the piston 3 is not yet located in its primed position, as shown in FIG. 10, then the face 60 is not located in the aperture 61, and the user can know that they must wait a moment before attempting to rotate the operating plunger 5. Once the face 60 is present in the aperture 61 again, as shown in FIG. 1, then the piston 3 is located at the top 22 of the cylinder 2 in its primed position, and the dispensing device 1 is ready to be operated again.

The dispensing device 1 can be altered without departing from the scope of claim 1. For example, in alternative embodiments (not shown), the engagement means operatively connects with the piston through a lateral movement of the operating plunger which is substantially normal to its movement along the stroke axis. In different versions the lateral movement can be from either side, or from above or below the outer point of the operating plunger. In these alternative embodiments the engagement are tabs which interact laterally with slots provided on the pistons.

In another alternative embodiment (not shown), the operating plunger is offset from the piston, and its path is oblique to the stroke axis. The operating plunger is mounted to a hinge on the dispensing device about which the part of the operating plunger which is connected to the piston rotates in a planetary fashion. As such, the path is actuate, and a joint between the operating plunger and the piston transmits this motion into a linear motion of the piston along the stroke axis.

In another alternative embodiment (not shown), the piston comprises a radially outwardly extending slot, and the operating plunger comprises a radially inwardly extending tab which moves into the slot when the operating plunger is rotated.

Therefore, the present invention provides a dispensing device in which it is necessary to first move the operating plunger into the engaged position before it can be moved along its path to drive the piston. As this movement is of a different kind to movement along the path, inadvertent activation of the device is avoided. This is particularly the case with the embodiment shown, in which inadvertent rotation of the operating plunger is very unlikely. Furthermore, rotation of the operating plunger requires a conscious manual effort of the user, which increases their interaction with the device and decreases the likelihood of accidental over dosing. In addition, the operating plunger can be moved harmlessly along its path when it is not connected to the piston, which avoids the problems associated with locking the operating plunger in a stand by position in the prior art, for example attempts to force it. A dispensing device is also realised which achieves the various above described advantages of delayed single shot dispensers like that shown in WO 97/23156 to Unilever, without any complex additional operating plunger locking features.

The invention claimed is:

1. A dispensing device comprising a cylinder, a piston disposed in said cylinder and moveable therein to perform a priming stroke to draw a fluid into said cylinder and a dispensing stroke to pump said fluid from said cylinder, a first spring device biasing said piston to perform said priming stroke at a predetermined rate, and an operating plunger mounted for movement on said dispensing device along a path and operatively connectable to said piston to drive said piston to perform said dispensing stroke, in which said operating plunger comprises an engagement surface and is moveable between an engaged position in which said engagement surface is operatively connected to said piston and movement of said operating plunger on said dispensing device along said path is transmitted to said piston, and a disengaged position in which said engagement surface is operatively disconnected from said piston and movement of said operating plunger on said dispensing device along said path is independent of said piston, and in which said engagement surface is positioned such that movement of said operating plunger on said dispensing device between said engaged and disengaged positions is in a different direction to movement along said path.

2. A dispensing device as claimed in claim 1 in which said operating plunger comprises a rotation axis, and in which said operating plunger is rotated on said axis to move it between said engaged and disengaged positions.

3. A dispensing device as claimed in claim 2 in which said piston and said operating plunger are arranged co-axially on a stroke axis, and in which said path of the operating plunger comprises said stroke axis.

4. A dispensing device as claimed in claim 3 in which said dispenser comprises a second spring device biasing said operating plunger to move from said engaged position to said disengaged position.

5. A dispensing device as claimed in claim 4 in which said operating plunger is movable axially on said stroke axis between an outer point and an inner point, and in which said second spring device also biases said operating plunger to move from said inner point to said outer point.

6. A dispensing device as claimed in claim 5 in which said piston comprises a radially outwardly extending tab, in which said operating plunger comprises a radially inwardly extending slot, and in which in said engaged position said tab is disposed in said slot.

7. A dispensing device as claimed in claim 6 in which said tab and said slot are axially co-incident when said piston is at a top of said cylinder after a priming stroke thereof and said operating plunger is at said outer point.

8. A dispensing device as claimed in claim 7 in which said operating plunger comprises an axially extending wall, in which when said operating plunger is at said outer point and in said disengaged position and said piston is displaced from the top of said cylinder said wall engages said tab and prevents movement of said operating plunger from said disengaged position to said engaged position.

9. A dispensing device as claimed in claim 8 in which said first spring device comprises a first coil spring biasing said piston to perform said priming stroke, and an impedance mechanism adapted to impede movement of said piston during said priming stroke to at or below said predetermined rate.

10. A dispensing device as claimed in claim 1 in which said first spring device comprises a first coil spring biasing said piston to perform said priming stroke, and an impedance mechanism adapted to impede movement of said piston during said priming stroke to at or below said predetermined rate.

11. A dispensing device as claimed in claim 10 in which said piston comprises a face, an annular side wall extending therefrom and comprising an outer end, a flange extending radially from said outer end and comprising an outer edge, and a collar extending substantially normally from said outer edge, in which when said piston is at a bottom of said cylinder after said dispensing stroke said flange overlies the top of said cylinder and said collar is disposed radially outwardly of said cylinder, in which said operating plunger comprises a substantially tubular body disposed radially outwardly of said collar, in which said tab is provided on an outer surface of said collar and said slot and wall are provided on an inner surface of said tubular body.

12. A dispensing device as claimed in claim 11 in which said first coil spring is mounted around said cylinder between a first static surface of said dispensing device and an underside of said flange.

13. A dispensing device as claimed in claim 12 in which said dispensing device comprises a second static surface disposed axially between said operating plunger and said piston, in which said second spring device comprises a coil spring mounted inside said operating plunger between said second static surface and an underside of an end wall of said operating plunger.

14. A dispensing device as claimed in claim 13 in which said piston comprises an indicator member extending outwardly from an underside of said face, in which said end wall of said operating plunger comprises an aperture, in which said indicator member is so sized that when said tab and said slot are axially co-incident and/or said operating plunger is in said engaged position, said indicator member is disposed in said aperture.

15. A dispensing device as claimed in claim 14 in which said indicator member comprises a coil spring carrying an indicator body at an outer end thereof.

16. A dispensing device comprising a cylinder, a piston disposed in said cylinder and moveable therein between a top of the cylinder and a bottom of the cylinder in a priming direction and in a dispensing direction, a first spring device biasing said piston to move in said priming direction at a predetermined rate, and an operating plunger moveable between an engaged position in which it is operatively connected to said piston and movement of said operating plunger along a path is transmitted to said piston, and a disengaged position in which it is operatively disconnected from said piston,
   in which said operating plunger is movable between an outer point and an inner point, in which a second spring device biases said operating plunger to move from said inner point to said outer point independently of said piston,
   in which said piston comprises an indicator member, in which said operating plunger comprises an end wall comprising an aperture, and in which when said operating plunger is at said outer point and said piston is at the top of said cylinder, said indicator member is disposed in said aperture.

17. The dispensing device as claimed in claim 16 in which said piston comprises a face, in which said indicator member extends outwardly from an underside of said face and is so sized that it is disposed in said aperture when said operating plunger is at said outer point and said piston is at the top of said cylinder.

18. The dispensing device as claimed in claim 17 in which said indicator member comprises a coil spring carrying an indicator body at an outer end thereof.

19. The dispensing device as claimed in claim 16 in which said first spring means comprises a first coil spring biasing said piston to move in said priming direction, and an impedance mechanism adapted to impede movement of said piston in said priming direction to at or below said predetermined rate.

20. The dispensing device as claimed in claim 16 in which said piston comprises a face, an annular side wall extending therefrom and comprising an outer end, a flange extending radially from said outer end and comprising an outer edge, and a collar extending substantially normally from said outer edge, in which when said piston is at the bottom of said cylinder after a dispensing stroke thereof said flange overlies the top of said cylinder and said collar is disposed radially outwardly of said cylinder, in which said operating plunger comprises a substantially tubular body disposed radially outwardly of said collar.

21. The dispensing device as claimed in claim 20 in which said first coil spring is mounted around said cylinder between a first static surface of said dispensing device and an underside of said flange.

22. The dispensing device as claimed in claim 16 in which said dispensing device comprises a second static surface disposed axially between said operating plunger and said piston, in which said second spring means comprises a coil spring mounted inside said operating plunger between said second static surface and an underside of said end wall of said operating plunger.

23. The dispensing device as claimed in claim 22 in which said piston comprises a face, in which said indicator member extends outwardly from an underside of said face, in which said indicator member comprises a coil spring carrying an indicator body at an outer end thereof, and in which said indicator member is disposed radially inside said second spring means.

24. A dispensing device comprising a cylinder, a piston disposed in said cylinder and moveable therein between a top of the cylinder and a bottom of the cylinder in a priming direction and in a dispensing direction, a first spring device biasing said piston to move in said priming direction at a predetermined rate, and an operating plunger moveable between an engaged position in which it is operatively connected to said piston and movement of said operating plunger along a path is transmitted to said piston, and a disengaged position in which it is operatively disconnected from said piston,
   in which said operating plunger is movable between an outer point and an inner point, in which a second spring device biases said operating plunger to move from said inner point to said outer point independently of said piston,
   in which said dispensing device comprises a second static surface disposed axially between said operating plunger and said piston, and in which said second spring device comprises a coil spring mounted inside said operating plunger between said second static surface and an underside of an end wall of said operating plunger.

25. The dispensing device as claimed in claim 24 in which said dispensing device comprises a tubular retention member which encloses said cylinder and said piston and comprises an end stop ring which prevents movement of said piston beyond the top of said cylinder, in which said retention member further comprises an inwardly depending portion which extends inwardly from said end stop ring, in which a bottom of said inwardly depending portion defines said second static surface.

26. The dispensing device as claimed in claim 24 in which said piston comprises an indicator member, in which said operating plunger comprises an end wall comprising an aperture, in which when said operating plunger is at said outer point and said piston is at the top of said cylinder, said indicator member is disposed in said aperture, in which said piston comprises a face, in which said indicator member extends outwardly from an underside of said face and is so sized that it is disposed in said aperture when said operating plunger is at said outer point and said piston is at the top of said cylinder.

27. The dispensing device as claimed in claim 26 in which said indicator member comprises a coil spring carrying an indicator body at an outer end thereof.

28. The dispensing device as claimed in claim 27 in which said indicator member is disposed radially inside said second spring means.

29. The dispensing device as claimed in claim 24 in which said first spring means comprises a first coil spring biasing said piston to move in said priming direction, and an impedance mechanism adapted to impede movement of said piston in said priming direction to at or below said predetermined rate.

30. The dispensing device as claimed in claim 24 in which said piston comprises a face, an annular side wall extending therefrom and comprising an outer end, a flange extending radially from said outer end and comprising an outer edge, and a collar extending substantially normally from said outer edge, in which when said piston is at the bottom of said cylinder after a dispensing stroke thereof said flange overlies the top of said cylinder and said collar is disposed radially outwardly of said cylinder, in which said operating plunger comprises a substantially tubular body disposed radially outwardly of said collar.

31. The dispensing device as claimed in claim 30 in which said first coil spring is mounted around said cylinder between a first static surface of said dispensing device and an underside of said flange.

* * * * *